US009425895B2

(12) United States Patent
Ke et al.

(10) Patent No.: US 9,425,895 B2
(45) Date of Patent: Aug. 23, 2016

(54) SIGNAL RECEIVING MODULE AND DISPLAY APPARATUS

(71) Applicant: Wistron Corporation, New Taipei (TW)

(72) Inventors: Ming-Shiang Ke, New Taipei (TW); Ping-Sheng Su, New Taipei (TW); Chih-Chung Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/613,363

(22) Filed: Feb. 4, 2015

(65) Prior Publication Data

US 2015/0341115 A1    Nov. 26, 2015

(30) Foreign Application Priority Data

May 23, 2014 (TW) .............................. 103118061 A

(51) Int. Cl.
| H04B 10/11 | (2013.01) |
| H04B 10/114 | (2013.01) |
| G02B 6/26 | (2006.01) |
| G02B 6/42 | (2006.01) |
| H04B 10/00 | (2013.01) |
| G06F 3/042 | (2006.01) |
| G02B 17/00 | (2006.01) |
| G08C 19/36 | (2006.01) |
| G08C 23/04 | (2006.01) |

(52) U.S. Cl.
CPC ............ *H04B 10/1141* (2013.01); *G02B 6/26* (2013.01); *G02B 6/42* (2013.01); *G02B 17/006* (2013.01); *G06F 3/0421* (2013.01); *G08C 19/36* (2013.01); *G08C 23/04* (2013.01); *H04B 10/12* (2013.01)

(58) Field of Classification Search
CPC ................. H04B 10/12; H04B 10/25; G02B 6/26–6/264; G02B 17/006
USPC ........................... 398/140–142; 345/173–175
See application file for complete search history.

(56) References Cited

U.S. PATENT DOCUMENTS 8,624,810 B2 * 1/2014 Ahn ...................... G02F 1/1336
                                                                       345/173
8,704,801 B2 * 4/2014 Tsai ...................... G02B 6/0076
                                                                       345/173

(Continued)

FOREIGN PATENT DOCUMENTS

TW          I412838          10/2013

OTHER PUBLICATIONS

"Office Action of Taiwan Counterpart Application with partial English translation", issued on Sep. 23, 2015, p. 1- p. 12.

*Primary Examiner* — Li Liu
(74) *Attorney, Agent, or Firm* — Jianq Chyun IP Office

(57) ABSTRACT

A signal receiving module, adapted to receiving a signal light, includes an optical sheet, at least one light-emitting device, and at least one sensing device. The optical sheet includes a first surface, a second surface, and at least one hole, wherein the second surface is opposite to the first surface, and the at least one light-emitting device is disposed in the at least one hole respectively. The light-emitting device includes a light-emitting unit and a first lens. The first lens is disposed on the light-emitting unit. The optical sheet is located above the sensing device, and the sensing device is distant from the hole, wherein the first lens of the light-emitting device refracts the signal light, and the sensing device receives the refracted signal light. A display apparatus is also provided.

20 Claims, 5 Drawing Sheets

(56) References Cited

U.S. PATENT DOCUMENTS

| | | | | |
|---|---|---|---|---|
| 8,729,804 B2* | 5/2014 | Tien | ................... | G02B 6/0028 315/111.01 |
| 2004/0201548 A1* | 10/2004 | Watanabe | ................ | G09G 3/20 345/30 |
| 2007/0291325 A1* | 12/2007 | Toyota | ................. | G06F 3/0412 358/474 |
| 2009/0225502 A1 | 9/2009 | Cheng et al. | | |
| 2010/0060611 A1* | 3/2010 | Nie | ...................... | G06F 1/3203 345/175 |
| 2010/0321309 A1* | 12/2010 | Lee | ...................... | G06F 3/0421 345/173 |
| 2011/0032214 A1* | 2/2011 | Gruhlke | ................ | G02B 5/045 345/175 |
| 2011/0122095 A1* | 5/2011 | Tsai | ..................... | G02B 6/0076 345/175 |
| 2011/0157097 A1* | 6/2011 | Hamada | .............. | G02F 1/13338 345/175 |
| 2011/0267317 A1* | 11/2011 | Tsuda | .................. | G02F 1/13338 345/175 |
| 2011/0298989 A1 | 12/2011 | Horisawa | | |
| 2012/0268402 A1* | 10/2012 | Wang | ..................... | G06F 3/041 345/173 |
| 2013/0201721 A1* | 8/2013 | Tsai | ..................... | G02B 6/0036 362/609 |
| 2015/0070327 A1* | 3/2015 | Hsieh | ................... | G06F 3/0421 345/175 |
| 2015/0300594 A1* | 10/2015 | Lee | ..................... | G02B 19/0028 362/97.1 |
| 2015/0331279 A1* | 11/2015 | Kimura | .................. | G02B 5/201 349/42 |

* cited by examiner

SIGNAL RECEIVING MODULE AND DISPLAY APPARATUS

CROSS-REFERENCE TO RELATED APPLICATION

This application claims the priority benefit of Taiwan application serial no. 103118061, filed on May 23, 2014. The entirety of the above-mentioned patent application is hereby incorporated by reference herein and made a part of this specification.

BACKGROUND OF THE INVENTION

1. Field of the Invention

The invention relates to an optical module and an electronic apparatus and more particularly relates to a signal receiving module and a display apparatus.

2. Description of Related Art

As the optical technology develops, display apparatuses continue to evolve. In electronic products, such as displays, TVs, and cameras, that require display apparatuses, the display apparatus may further include a wireless signal sensing device. The electronic product may receive a wireless signal (e.g. infrared signal) through the wireless signal sensing device (e.g. infrared sensing device) of the display apparatus, and the display apparatus or the electronic product is operated and controlled according to the received wireless signal.

For developers of the electronic products, the differences of the exterior designs and system element configurations impose different limitations to the internal structures when new models are developed. In view of such limitations, the design of the wireless signal sensing device (e.g. infrared sensing device) also needs to be changed to achieve favorable signal reception. For example, the design of the wireless signal sensing device needs to be changed according to the position of the wireless signal sensing device relative to the internal parts and the housing. The design may include the wire layout design and lens design at the receiving end. Therefore, the time and costs required for development are increased. Consequently, the efficiency of development or improvement of the electronic products cannot be enhanced.

SUMMARY OF THE INVENTION

An embodiment of the invention provides a signal receiving module that includes a properly integrated sensing device.

An embodiment of the invention provides a display apparatus that includes a properly integrated sensing device, and the sensing device is adapted for display apparatuses of various exterior designs.

An embodiment of the invention provides a signal receiving module adapted to receiving a signal light. The signal receiving module includes an optical sheet, at least one light-emitting device, and at least one sensing device. The optical sheet includes a first surface, a second surface, and at least one hole, wherein the second surface is opposite to the first surface, and the at least one light-emitting device is disposed in the at least one hole respectively. Each light-emitting device includes a light-emitting unit and a first lens. The first lens is disposed on the light-emitting unit. The optical sheet is located above the sensing device, and the sensing device is distant from the hole, wherein the first lens of the light-emitting device refracts the signal light. The signal light comes from a side close to the first surface of the optical sheet, and the sensing device receives the refracted signal light.

An embodiment of the invention provides a display apparatus that includes a display panel and the signal receiving module. The display panel is disposed on the signal receiving module. The first surface faces the display panel. The signal light passes through the display panel and then reaches the first lens of the light-emitting device. The first lens refracts the signal light, and the sensing device receives the refracted signal light.

In an embodiment of the invention, the signal receiving module further includes a back plate. The optical sheet is disposed above the back plate, and the back plate includes a third surface facing the second surface. The sensing device is disposed between the back plate and the optical sheet.

In an embodiment of the invention, the optical sheet is a reflective sheet.

In an embodiment of the invention, the signal receiving module further includes at least one circuit board. The light-emitting unit of the light-emitting device is electrically connected with the circuit board.

In an embodiment of the invention, the at least one light-emitting device is disposed on the at least one circuit board, and a distance exists between the circuit board and the optical sheet in a direction parallel to the first surface.

In an embodiment of the invention, the sensing device includes at least one sensing convex surface formed on a surface of the sensing device, and the sensing device receives the refracted signal light through the sensing convex surface.

In an embodiment of the invention, the sensing convex surface is formed on a surface of the sensing device that faces the second surface, and a shortest distance between the sensing convex surface and the second surface is 0-0.5 mm.

In an embodiment of the invention, a distance between the first lens and the first surface in a direction perpendicular to the first surface is 0-0.8 mm.

In an embodiment of the invention, the number of the at least one hole is plural and the number of the at least one light-emitting device is plural.

In an embodiment of the invention, any two adjacent first lenses have a distance P therebetween, and the first lens that is closest to the sensing device among the first lenses and the sensing device have a distance D therebetween in the direction parallel to the first surface, wherein $0.47 \leq D/P \leq 0.75$.

In an embodiment of the invention, the number of the at least one light-emitting device is plural, and the number of the at least one sensing device is one, wherein a distance between each of at least two adjacent first lenses in the light-emitting devices and the sensing device in the direction parallel to the first surface is the same.

In an embodiment of the invention, the hole is substantially formed at a position of the optical sheet corresponding to a center of the display panel.

Based on the above, in the signal receiving module provided by the embodiments of the invention, the signal light from the outside is transmitted to the sensing device covered by the optical sheet via at least one of the first lenses in the light-emitting devices. That is, the sensing device is integrated into the signal receiving module. Moreover, the signal receiving module may be used in combination with a display panel according to the actual needs, and as the signal receiving module is assembled, the configuration of the sensing device is also completed. Thus, it is not required to redesign the sensing device according to the exterior shape of the display apparatus, and the efficiency of research/development and fabrication is improved. In the display apparatus provided by the embodiments of the invention, the sensing device is integrated into the signal receiving module of the display apparatus. Therefore, when developing or fabricating the display apparatus, the sensing device is not limited by the exterior shape of the display apparatus nor limited by other system elements in the display apparatus. Accordingly, the efficiency of research/development and fabrication is improved and the difficulty in research/development and fabrication is reduced.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

It is to be understood that the foregoing and other detailed descriptions, features, and effects are intended to be described more comprehensively by providing an embodiment accompanied with figures hereinafter. The language used to describe the directions such as up, down, left, right, front, back or the like in the following embodiment is regarded in an illustrative rather than in a restrictive sense. Thus, the language used to describe the directions is not intended to limit the scope of the invention.

Figure 1A:
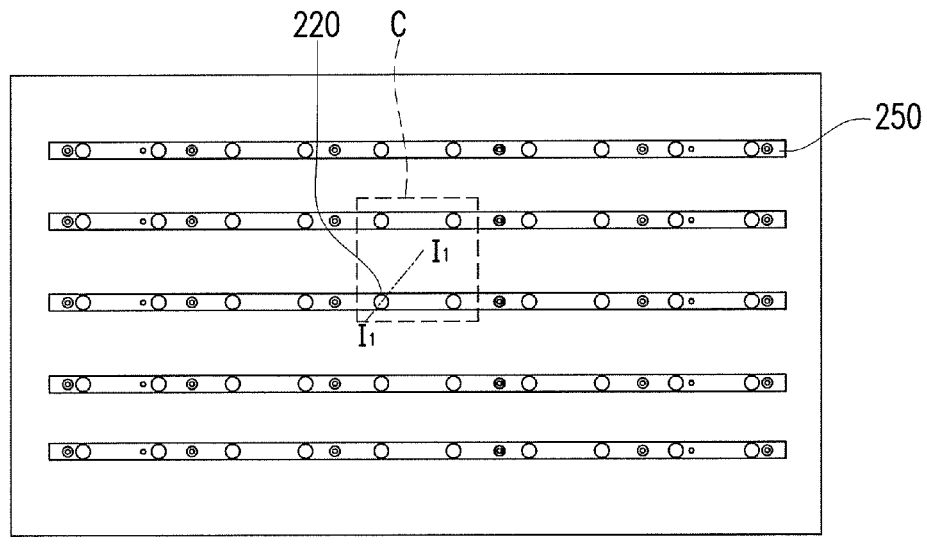
FIG. 1A is a schematic partial top view of a display apparatus according to the first embodiment of the invention.
Figure 1B:
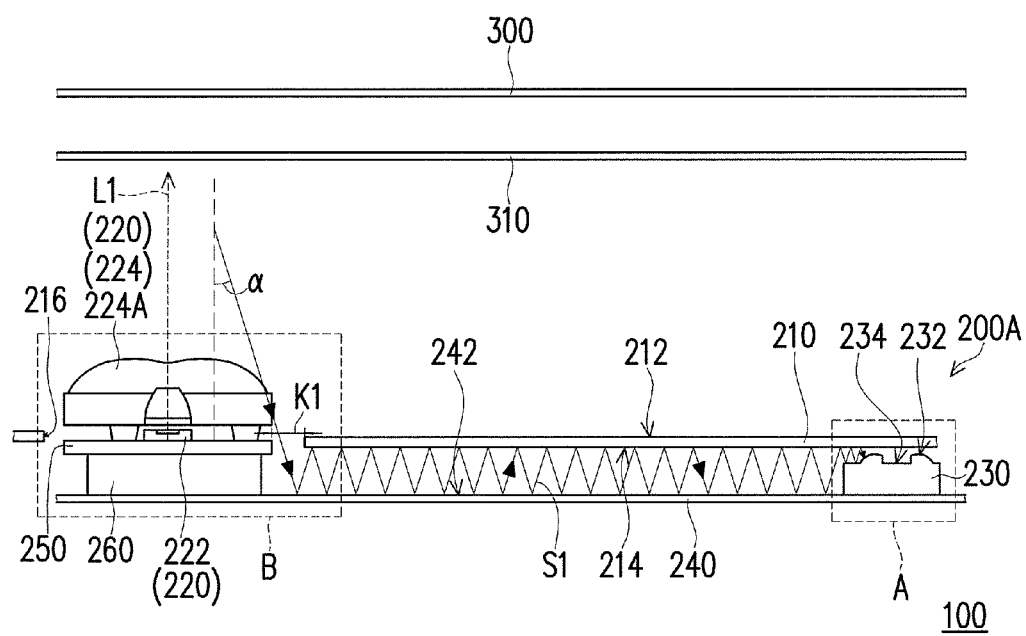
FIG. 1B is a schematic cross-sectional view taken along a line segment I1-I1 in FIG. 1A.

FIG. 1A is a schematic partial top view of a display apparatus according to the first embodiment of the invention. FIG. 1B is a schematic cross-sectional view taken along a line segment I1-I1 in FIG. 1A. It should be noted that, in order to clearly illustrate the configuration of the display apparatus in the first embodiment of the invention, a display panel and an optical sheet are omitted from the partial top view of FIG. 1A. With reference to FIG. 1A and FIG. 1B, in the first embodiment of the invention, a display apparatus 100 includes a signal receiving module 200A and a display panel 300, wherein the signal receiving module 200A includes an optical sheet 210, a plurality of light-emitting devices 220, and at least one sensing device 230 (one sensing device 230 is illustrated as an example in this embodiment). The optical sheet 210 includes a first surface 212, a second surface 214, and a hole 216, wherein the second surface 214 is opposite to the first surface 212. The light-emitting device 220 is disposed in the hole 216. The light-emitting device 220 includes a light-emitting unit 222 and a first lens 224A. The light-emitting unit 222 emits a first light L1. The first lens 224A is disposed on the light-emitting unit 222, and the first lens 224A is disposed on a path of the first light L1. The optical sheet 210 is disposed above the sensing device 230. The sensing device 230 is distant from the hole 216 (for example, a distance exists between the sensing device 230 and the hole 216 in a direction parallel to the second surface 214), wherein a signal light S1 passes through the display panel 300 and reaches the first lens 224A of the light-emitting device 220, and then the signal light S1 is refracted by the first lens 224A to be received by the sensing device 230.

More specifically, with reference to FIG. 1B, in the first embodiment of the invention, the signal receiving module 200A further includes a back plate 240, and the optical sheet 210 is disposed on the back plate 240. The back plate 240 includes a third surface 242, wherein the third surface 242 faces the second surface 214. The sensing device 230 and the light-emitting device 220 are both disposed on the third surface 242. To be more specific, with reference to FIG. 1B, in the first embodiment of the invention, the optical sheet 210 is a reflective sheet, wherein a first reflective surface forms the first surface 212, a second reflective surface forms the second surface 214, and a third reflective surface forms the third surface 242. More specifically, in this embodiment, a position of an orthographic projection of the hole 216 on the back plate 240 in a direction perpendicular to the first surface 212 does not overlap a position of the sensing device 230.

Furthermore, with reference to FIG. 1A and FIG. 1B, in the first embodiment of the invention, the signal receiving module 200A further includes at least one circuit board 250 (five circuit boards are illustrated here as an example). The light-emitting unit 222 is disposed on the circuit board 250, and the light-emitting unit 222 is electrically connected with the circuit board 250. In this embodiment, a distance K1 exists between the circuit board 250 and the reflective sheet (i.e. the optical sheet 210) in a direction parallel to the first surface 212. However, the invention is not limited thereto. In other embodiments, the circuit board 250 may also be separated from the optical sheet 210 by a distance in other directions, and the light-emitting unit 222 may be disposed beside the circuit board 250 and electrically connected with the circuit board 250.

With reference to FIG. 1B, in the first embodiment of the invention, the first lens 224A of the light-emitting device 220 is adapted to refracting the signal light S1 that passes through the display panel 300 and reaches the first lens 224A of the light-emitting device 220. In this embodiment, the hole 216 is substantially formed at a position of the optical sheet 210 corresponding to a center of the display panel 300. However, the invention is not limited thereto. In this embodiment, the sensing device 230 is adapted to receiving the refracted signal light S1. More specifically, with reference to FIG. 1B, in this embodiment, for example, the signal light S1 refracted by the first lens 224A is transmitted between the second reflective surface (i.e. the second surface 214) and the third reflective surface (i.e. the third surface 242) and then reflected by the second reflective surface (i.e. the second surface 214) and the third reflective surface (i.e. the third surface 242) several times to reach the sensing device 230. The sensing device 230 then receives the reflected signal light S1. To be more specific, in this embodiment, the first lens 224A, the second reflective surface (i.e. the second surface 214), and the third reflective surface (i.e. the third surface 242) cause the signal light S1 that reaches the first surface 212 at an incident angle α to be transmitted to the sensing device 230, wherein the incident angle α is about 19 degrees, for example. Nevertheless, it is noted that the invention is not limited thereto. Thus, in the first embodiment of the invention, with the configuration of the first lens 224A, the signal receiving module 200A of the display apparatus 100 is capable of transmitting the signal light from the outside (e.g. the signal light S1) to the sensing device 230, and the sensing device 230 is disposed on a back surface of the optical sheet 210 relative to the external. In other words, in this embodiment, the sensing device 230 is integrated into the signal receiving module 200A. Therefore, the sensing device 230 is not limited by the exterior shape of the display apparatus 100 nor limited by other system elements in the display apparatus 100. Accordingly, the efficiency of research/development and fabrication is improved and the difficulty in research/development and fabrication is reduced.

With reference to FIG. 1B, in the first embodiment of the invention, the display apparatus 100 further includes an optical diffuser plate 310 disposed between the optical sheet 210 and the display panel 300. More specifically, in this embodiment, a portion of the first light L1 emitted by the light-emitting unit 222 is refracted by the first lens 224A and transmitted to the optical diffuser plate 310, and the portion of the first light L1 is diffused by the optical diffuser plate 310 and transmitted to the display panel 300, so as to provide the display panel 300 a favorable light source. On the other hand, in this embodiment, a portion of the first light L1 is transmitted to the first reflective surface (i.e. the first surface 212) after passing through the first lens 224A, or another portion of the first light L1 is transmitted to the first reflective surface (i.e. the first surface 212) after being reflected by the optical diffuser plate 310, and the first reflective surface (i.e. the first surface 212) reflects the first light so as to improve the utilization efficiency of the light source. In other embodiments, the first reflective surface (i.e. the first surface 212) of the signal receiving module further includes a plurality of optical micro-structures for improving the utilization efficiency of the light source. In other embodiments, the display apparatus further includes an optical diffuser plate or a brightness enhancement film disposed between the display panel and the optical sheet.

In the first embodiment of the invention, the light-emitting unit 222 is a light-emitting diode, for example. However, it is noted that the invention is not limited thereto. In other embodiments, the light-emitting unit 222 may be other elements suitable for emitting light. In the first embodiment of the invention, the sensing device 230 is an infrared receiving device, for example, and the signal light S1 is an infrared signal light emitted by a remote controller or other infrared signal transmitting devices. However, it is noted that the invention is not limited thereto. Furthermore, in the first embodiment of the invention, a sensing circuit board (not shown) may be further included to be electrically connected with the sensing device 230. However, it is noted that the invention is not limited thereto. In other embodiments, the signal receiving module may include only one circuit board that electrically connects the sensing device 230 and the light-emitting unit 222.

To be more specific, with reference to FIG. 1B, in the first embodiment of the invention, the sensing device 230 includes at least one sensing convex surface 232 (two sensing convex surfaces are illustrated here as an example). The sensing convex surface 232 is formed on a surface 234 of the sensing device 230. The sensing device 230 receives the refracted signal light S1 through the sensing convex surface 232. To be more detailed, in this embodiment, the surface area of the surface 234 of the sensing device 230 is increased by the sensing convex surface 232, such that the sensing device 230 receives the signal light S1 more easily. Moreover, in this embodiment, the sensing convex surface 232 is formed on the surface 234 of the sensing device 230, which faces the second surface 214. However, it is noted that the invention is not limited thereto. In other embodiments, the sensing convex surface 232 may be respectively located on different surfaces of the sensing device 230. In this embodiment, the sensing convex surface 232 is a surface of a lens for refracting the signal light S1 to a sensing chip in the sensing device 230.

Figure 1C:
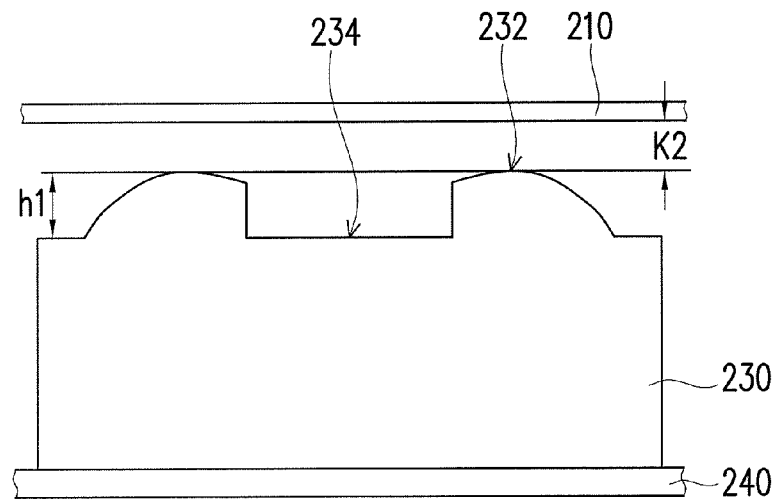
FIG. 1C is a schematic enlarged view of an area A in FIG. 1B.

FIG. 1C is a schematic enlarged view of an area A in FIG. 1B. With reference to FIG. 1C, in the first embodiment of the invention, a distance K2 between an end of the sensing convex surface 232, which is closest to the second surface 214, and the second surface 214 is 0-0.5 mm, for example. However, it is noted that the invention is not limited thereto. More specifically, in other embodiments of the invention, the second surface 214 of the optical sheet 210 is in direct contact with the sensing device 230, for example. On the other hand, with reference to FIG. 1C, in the first embodiment of the invention, the sensing convex surface 232 has a height h1 in the direction perpendicular to the second surface 214, and the height h1 is about 0.7 mm, for example. However, it is noted that the invention is not limited thereto.

Figure 1D:
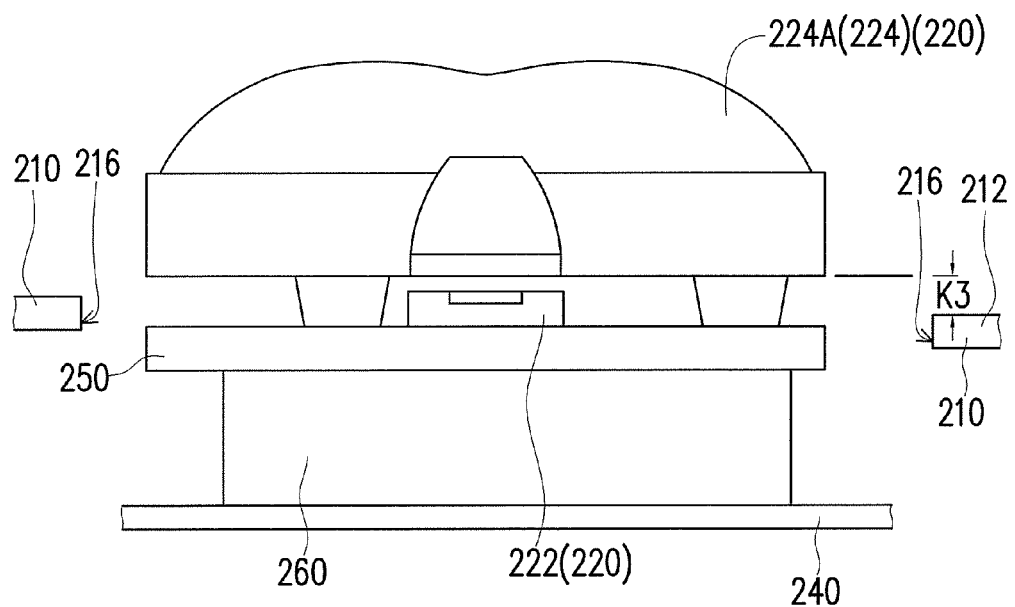
FIG. 1D is a schematic enlarged view of an area B in FIG. 1B.

FIG. 1D is a schematic enlarged view of an area B in FIG. 1B. More specifically, with reference to FIG. 1D, in the first embodiment of the invention, an interval between the circuit board 250 and the first lens 224A is about 1 mm, for example. However, it is noted that the invention is not limited thereto. On the other hand, with reference to FIG. 1D, in the first embodiment of the invention, an interval K3 between the first lens 224A and the first surface 212 in the direction perpendicular to the first surface 212 is 0-0.8 mm, for example. However, it is noted that the invention is not limited thereto. Furthermore, with reference to FIG. 1D, in the first embodiment of the invention, the signal receiving module 200 further includes a spacer 260 disposed between the circuit board 250 and the back plate 240, so as to maintain a proper distance between the circuit board 250 and the optical sheet 210. However, it is noted that the invention is not limited thereto. In other embodiments, the signal receiving module 200 further includes a rib disposed between the circuit board 250 and the back plate 240.

Figure 1E:
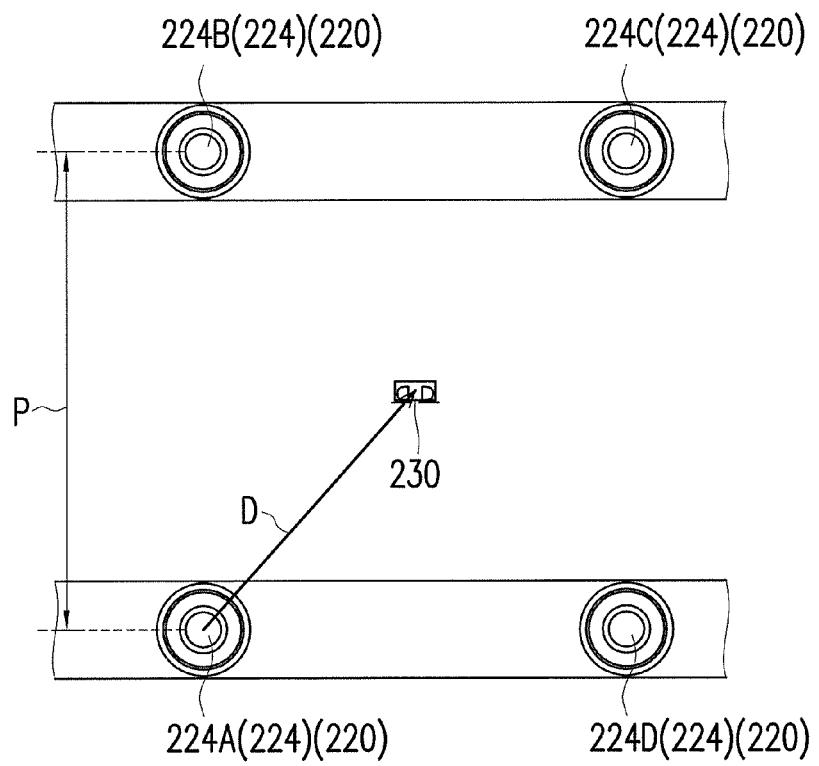
FIG. 1E is a schematic enlarged view of an area C in FIG. 1A.

FIG. 1E is a schematic enlarged view of an area C in FIG. 1A. More specifically, with reference to FIG. 1E, in the first embodiment of the invention, the light-emitting devices 220 include four light-emitting devices 220 that are adjacent to each other, for example. The four adjacent light-emitting devices 220 respectively have first lenses 224A, 224B, 224C, and 224D, and the distance between each of the first lenses 224A, 224B, 224C, and 224D and the sensing device 230 in the direction parallel to the first surface 212 is the same or about equal, wherein the light-emitting device 220 having the first lens 224A is disposed in the hole of the optical sheet. However, it should be noted that the invention is not limited thereto. In other embodiments, the optical sheet further includes a plurality of holes, and the light-emitting devices 220 having the first lenses 224A, 224B, 224C, and 224D are respectively disposed in the holes.

Figure 2A:
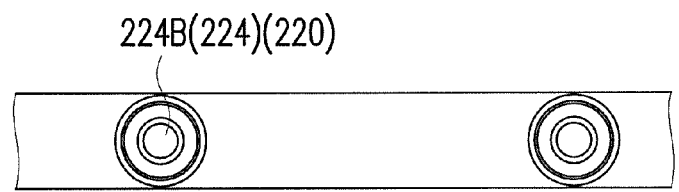
FIG. 2A is a schematic partial top view of a signal receiving module according to another embodiment of the invention.
Figure 2A:
Figure 2A:
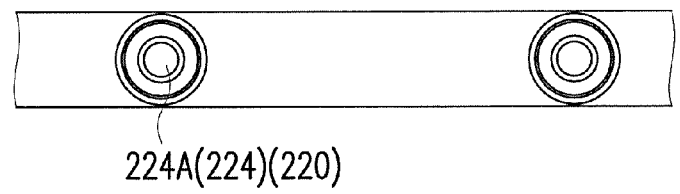

FIG. 2A is a schematic partial top view of a signal receiving module according to another embodiment of the invention. With reference to FIG. 2A, in another embodiment of the invention, the distance between each of two adjacent first lenses 224A and 224B in the light-emitting devices and the sensing device 230 in the direction parallel to the first surface 212 is the same or about equal, wherein the optical sheet includes two holes, and the light-emitting devices 220 having the first lenses 224A and 224B are respectively disposed in the two holes. However, it should be noted that the invention is not limited thereto. In other embodiments, the optical sheet may be formed with more holes for disposing the light-emitting devices according to the actual needs.

Figure 2B:
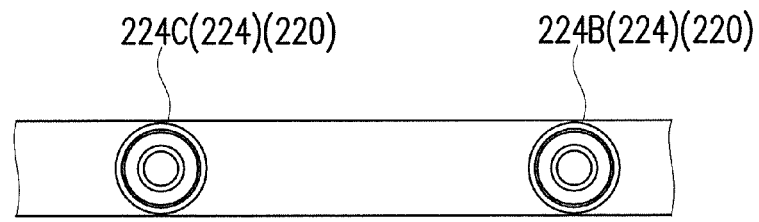
FIG. 2B is a schematic partial top view of a signal receiving module according to another embodiment of the invention.
Figure 2B:
Figure 2B:
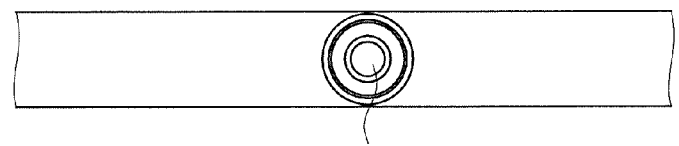

FIG. 2B is a schematic partial top view of a signal receiving module according to another embodiment of the invention. With reference to FIG. 2B, in another embodiment of the invention, the distance between each of three adjacent first lenses 224A, 224B, and 224C in the light-emitting devices and the sensing device 230 in the direction parallel to the first surface 212 is the same or about equal, wherein the optical sheet includes three holes, and three light-emitting devices 220 having the first lenses 224A, 224B, and 224C are respectively disposed in the three holes. However, it should be noted that the invention is not limited thereto. In other embodiments, the optical sheet may include more holes for disposing a plurality of light-emitting devices therein according to the actual needs, in a manner that the distance between each of the first lenses in the light-emitting devices and the sensing device in the direction parallel to the first surface is the same or about equal.

More specifically, with reference to FIG. 1E, in the first embodiment of the invention, any two adjacent first lenses 224 (e.g. the first lenses 224A and 224B) among the first lenses 224 have a distance P therebetween; and the first lens 224 (e.g. the first lens 224A), which is the one closest to the sensing device 230 among the first lenses 224, and the sensing device 230 have a distance D therebetween in the direction parallel to the first surface 212, wherein $0.47 \leq D/P \leq 0.75$. However, it should be noted that the invention is not limited thereto.

Figure 1F:
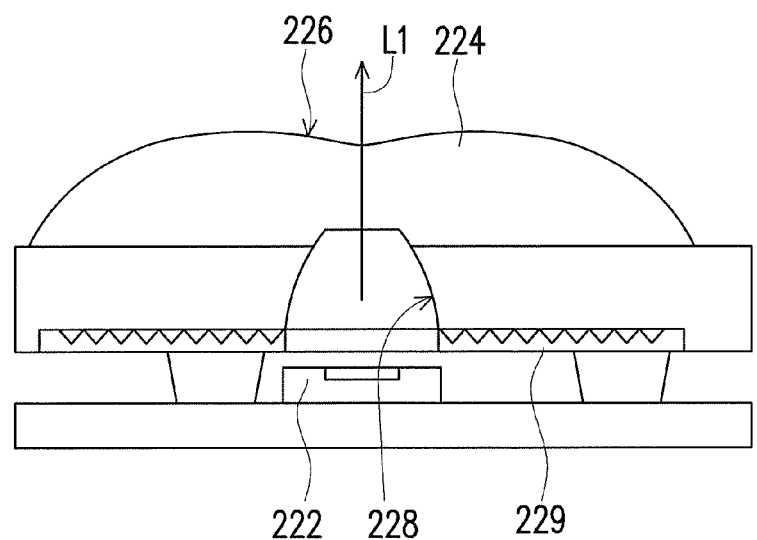
FIG. 1F is a schematic cross-sectional view of a light-emitting device according to the first embodiment of the invention.

FIG. 1F is a schematic cross-sectional view of a light-emitting device according to the first embodiment of the invention. With reference to FIG. 1F, in the first embodiment of the invention, the first lens 224 has a curved surface 226, and the curved surface 226 faces away from the light-emitting unit 222. To be more specific, in this embodiment, the first lens 224 further includes an inside surface 228 and a micro-structure layer 229, wherein the micro-structure layer 229 includes a plurality of micro-structures which are prisms, for example. In this embodiment, the first light L1 emitted by the light-emitting unit 222 enters the first lens 224 through the inside surface 228 and then exits through the curved surface 226. A portion of the first light may enter the first lens 224 through the inside surface 228 and then be reflected by the micro-structure layer 229 to exit through the curved surface 226. More specifically, the light emitted by the light-emitting unit 222 is more uniformly transmitted to the optical diffuser plate or the display panel after passing through the first lens 224.

Figure 3:
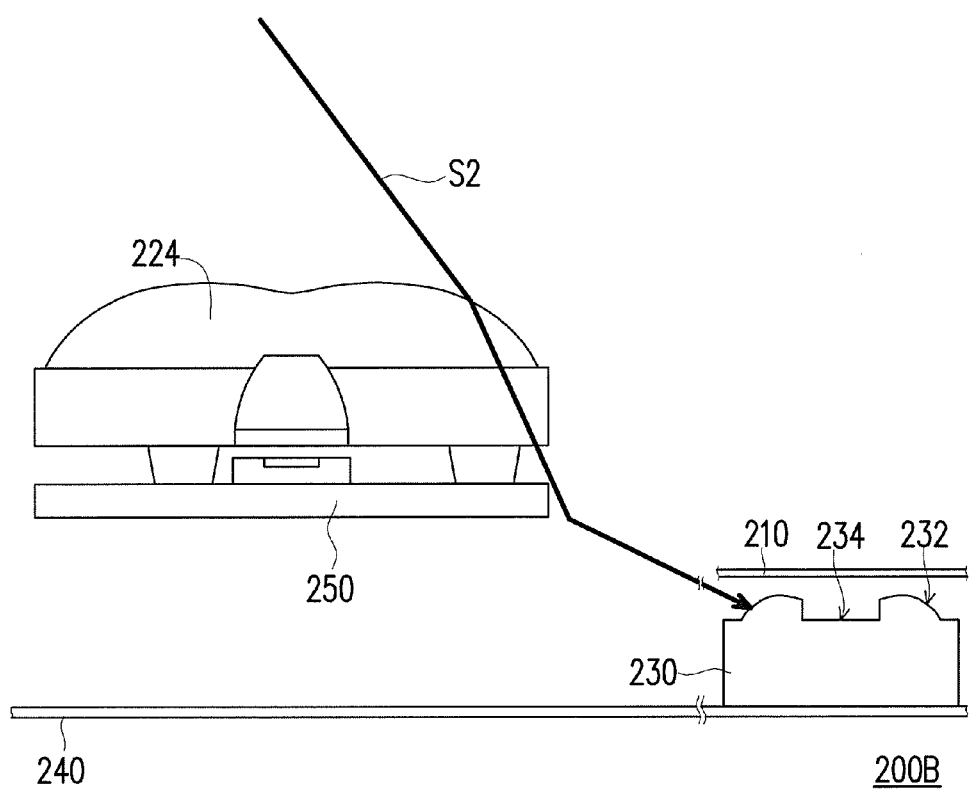
FIG. 3 is a schematic cross-sectional view of a signal receiving module according to other embodiments of the invention.

FIG. 3 is a schematic cross-sectional view of a signal receiving module according to other embodiments of the invention. With reference to FIG. 3, in this embodiment, a signal receiving module 200B is similar to the signal receiving module 200A of the first embodiment. A difference therebetween is that a signal light S2 from the outside directly reaches the sensing convex surface 232 of the sensing device 230 after being refracted by the first lens 224. In other words, in the first embodiment of the invention, the signal light from the outside is refracted by the first lens and then reflected between the second surface and the third surface to reach the sensing device. However, it is noted that the invention is not limited thereto. In other embodiments, the signal light may directly reach the sensing device after being refracted by the first lens.

In conclusion of the above, the signal receiving module provided by the embodiments of the invention transmits the signal light from the outside to the sensing device covered by the optical sheet through refraction of the first lens, so as to integrate the sensing device behind the optical sheet in the signal receiving module. The signal receiving module may be used in combination with a display panel according to the actual needs, and as the display panel is disposed to the signal receiving module, the configuration of the sensing device is also completed. Thus, it is not required to redesign the sensing device, and the efficiency of research/development and fabrication is improved. In the display apparatus provided by the embodiments of the invention, the sensing device is integrated into the signal receiving module of the display apparatus. Therefore, when developing or fabricating the display apparatus, the sensing device is not limited by the exterior shape of the display apparatus nor limited by other system elements in the display apparatus. Accordingly, the efficiency of research/development and fabrication is improved and the difficulty in research/development and fabrication is reduced.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A signal receiving module, adapted to receiving a signal light, the signal receiving module comprising:
   an optical sheet comprising a first surface, a second surface opposite to the first surface, and at least one hole, wherein the hole passes through the first surface and the second surface;
   at least one light-emitting device respectively disposed in the at least one hole, and each of the at least one light-emitting device comprising:
   a light-emitting unit; and
   a first lens disposed on the light-emitting unit; and
   at least one sensing device, wherein the optical sheet is disposed above the at least one sensing device, and the at least one sensing device is distant from the at least one hole, wherein the first lens of the at least one light-emitting device refracts the signal light, and the sensing device receives the refracted signal light.

2. The signal receiving module according to claim 1, further comprising a back plate, wherein the optical sheet is disposed above the back plate, and the back plate comprises a third surface facing the second surface, and the sensing device is disposed between the back plate and the optical sheet.

3. The signal receiving module according to claim 2, wherein the optical sheet is a reflective sheet.

4. The signal receiving module according to claim 2, further comprising at least one circuit board, wherein the light-emitting unit of the at least one light-emitting device is electrically connected with the at least one circuit board.

5. The signal receiving module according to claim 4, wherein the at least one light-emitting device is disposed on the at least one circuit board, and a distance exists between the at least one circuit board and the optical sheet in a direction parallel to the first surface.

6. The signal receiving module according to claim 1, wherein the sensing device comprises at least one sensing convex surface formed on a surface of the sensing device, and the sensing device receives the refracted signal light through the sensing convex surface.

7. The signal receiving module according to claim 6, wherein the sensing convex surface is formed on a surface of the sensing device that faces the second surface, and a shortest distance between the sensing convex surface and the second surface is in a range of 0-0.5 mm.

8. The signal receiving module according to claim 1, wherein a distance between the first lens and the first surface in a direction perpendicular to the first surface is in a range of 0-0.8 mm.

9. The signal receiving module according to claim 1, wherein the number of the at least one hole is plural, and the number of the at least one light-emitting device is plural.

10. The signal receiving module according to claim 9, wherein any two adjacent first lenses have a distance P therebetween, and the first lens that is closest to the sensing device among the first lenses and the sensing device have a distance D therebetween in the direction parallel to the first surface, wherein $0.47 \leq D/P \leq 0.75$.

11. The signal receiving module according to claim 1, wherein the number of the at least one light-emitting device is plural, and the number of the at least one sensing device is one, wherein a distance between each of at least two adjacent first lenses in the light-emitting devices and the sensing device in the direction parallel to the first surface is equal.

12. A display apparatus, comprising:
a display panel; and
a signal receiving module adapted to receiving a signal light, wherein the display panel is disposed on the signal receiving module, and the signal receiving module comprises:
an optical sheet comprising a first surface facing the display panel, a second surface opposite to the first surface, and at least one hole, wherein the hole passes through the first surface and the second surface; and
at least one light-emitting device respectively disposed in the at least one hole, and each of the at least one light-emitting device comprising:
a light-emitting unit; and
a first lens disposed on the light-emitting unit and located between the light-emitting unit and the display panel; and
at least one sensing device, wherein the optical sheet is disposed above the at least one sensing device, and the at least one sensing device is distant from the at least one hole, wherein the signal light passes through the display panel to reach the first lens of the at least one light-emitting device, and the first lens refracts the signal light and the sensing device receives the refracted signal light.

13. The display apparatus according to claim 12, wherein the signal receiving module further comprises a back plate, and the optical sheet is disposed above the back plate, wherein the back plate comprises a third surface facing the second surface, and the sensing device is disposed between the back plate and the optical sheet.

14. The display apparatus according to claim 13, wherein the optical sheet is a reflective sheet.

15. The display apparatus according to claim 13, wherein the signal receiving module further comprises at least one circuit board, the light-emitting unit of the at least one light-emitting device is electrically connected with the at least one circuit board, the at least one light-emitting device is disposed on the at least one circuit board, and a distance exists between the at least one circuit board and the optical sheet in a direction parallel to the first surface.

16. The display apparatus according to claim 12, wherein the sensing device comprises at least one sensing convex surface formed on a surface of the sensing device, and the sensing device receives the refracted signal light through the sensing convex surface.

17. The display apparatus according to claim 16, wherein the sensing convex surface is formed on a surface of the sensing device that faces the second surface, and a shortest distance between the sensing convex surface and the second surface is in a range of 0-0.5 mm.

18. The display apparatus according to claim 12, wherein a distance between the first lens and the first surface in a direction perpendicular to the first surface is in a range of 0-0.8 mm.

19. The display apparatus according to claim 12, wherein the number of the at least one hole is plural, and the number of the at least one light-emitting device is plural.

20. The display apparatus according to claim 19, wherein any two adjacent first lenses have a distance P therebetween, and the first lens that is closest to the sensing device among the first lenses and the sensing device have a distance D therebetween in the direction parallel to the first surface, wherein $0.47 \leq D/P \leq 0.75$.

* * * * *